(12) United States Patent
Noh et al.

(10) Patent No.: US 8,864,618 B1
(45) Date of Patent: Oct. 21, 2014

(54) PLANETARY GEAR TRAIN OF AUTOMATIC TRANSMISSION FOR VEHICLE

(71) Applicant: Hyundai Motor Company, Seoul (KR)

(72) Inventors: Myeong Hoon Noh, Seongnam-si (KR); Kangsoo Seo, Yongin-si (KR); Jae Chang Kook, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/140,394

(22) Filed: Dec. 24, 2013

(30) Foreign Application Priority Data

Jun. 14, 2013 (KR) .......................... 10-2013-0068321

(51) Int. Cl.
*F16H 3/62* (2006.01)
(52) U.S. Cl.
CPC ........................................ *F16H 3/62* (2013.01)
USPC .......................................... 475/278; 475/330
(58) Field of Classification Search
USPC .................... 475/275–278, 280, 296
See application file for complete search history.

(56) References Cited

U.S. PATENT DOCUMENTS

| | | | |
|---|---|---|---|
| 7,632,206 B2* | 12/2009 | Gumpoltsberger | 475/275 |
| 8,251,856 B2* | 8/2012 | Phillips et al. | 475/280 |
| 8,409,047 B2* | 4/2013 | Borgerson et al. | 475/284 |
| 8,425,370 B2* | 4/2013 | Leesch et al. | 475/276 |
| 8,734,286 B2* | 5/2014 | Coffey et al. | 475/276 |
| 2008/0242494 A1* | 10/2008 | Wittkopp et al. | 475/276 |
| 2010/0227731 A1* | 9/2010 | Shim | 475/276 |
| 2012/0214636 A1* | 8/2012 | Hart et al. | 475/276 |

* cited by examiner

*Primary Examiner* — Justin Holmes
(74) *Attorney, Agent, or Firm* — Morgan, Lewis & Bockius LLP

(57) ABSTRACT

A planetary gear train of an automatic transmission for a vehicle is disclosed. The planetary gear train can achieve ten forward speeds and one reverse speed by combining four planetary gear sets with three clutches and three brakes. Therefore, the planetary gear train can improve power delivery efficiency and fuel economy by achieving multiple shift-speeds of the automatic transmission.

9 Claims, 13 Drawing Sheets

FIG.2

|   | C1 | C2 | C3 | B1 | B2 | B3 |
|---|---|---|---|---|---|---|
| 1ST |  | ● |  |  | ● | ● |
| 2ND | ● |  |  |  | ● | ● |
| 3RD | ● |  |  | ● |  | ● |
| 4TH |  | ● |  | ● |  | ● |
| 5TH | ● | ● |  | ● |  |  |
| 6TH | ● | ● | ● |  |  |  |
| 7TH | ● |  | ● | ● |  |  |
| 8TH | ● |  | ● |  | ● |  |
| 9TH |  |  | ● | ● | ● |  |
| 10TH |  | ● | ● |  | ● |  |
| Rev | ● | ● |  |  | ● |  |

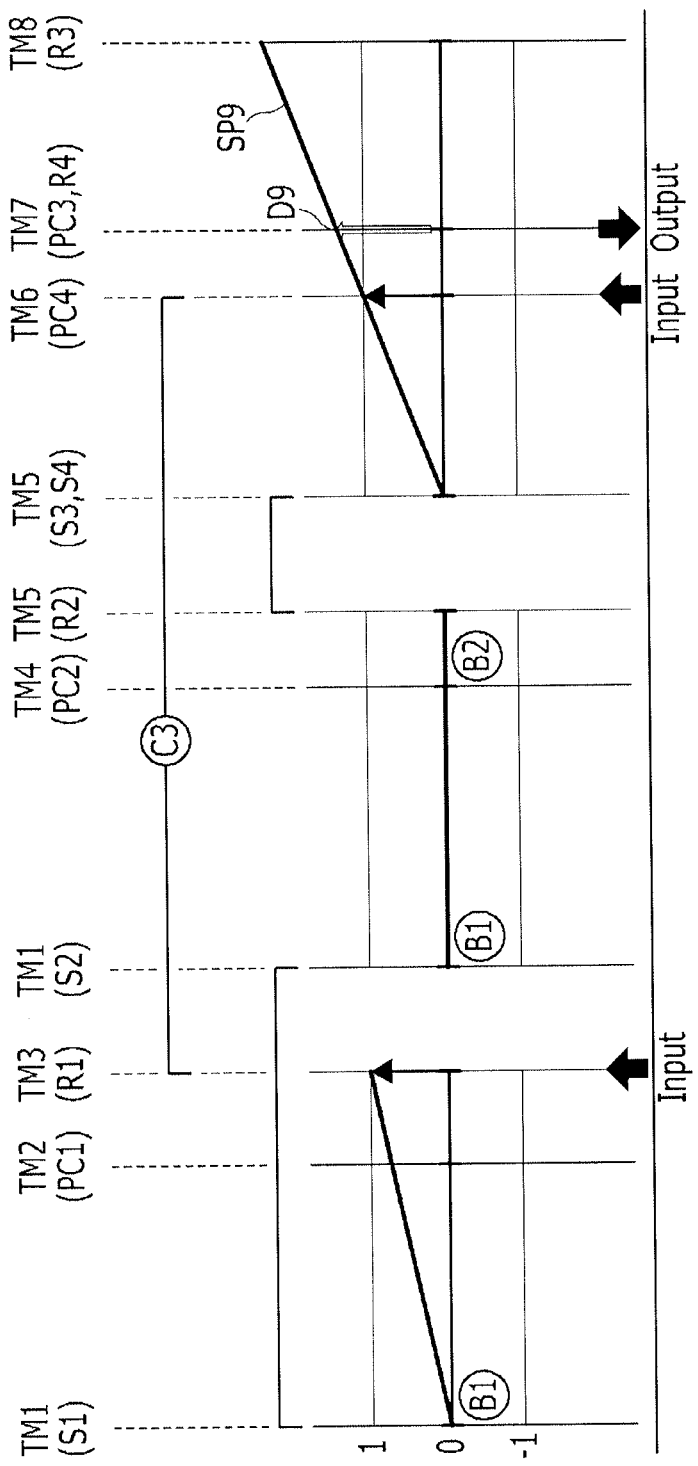

US 8,864,618 B1

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2013-0068321 filed on Jun. 14, 2013, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for a vehicle that can improve power delivery performance and reduce fuel consumption.

2. Description of Related Art

Typically, multiple-shift mechanism of an automatic transmission is achieved by combining a plurality of planetary gear sets. A planetary gear train converts torque transmitted from a torque converter into multiple speeds and transmits the multiple speeds to an output shaft.

It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

Currently, four-speed and five-speed automatic transmissions are most often found on the market. However, six-speed or seven-speed automatic transmissions have also been realized for enhancement of performance of power transmission and for enhanced fuel mileage of a vehicle. In addition, automatic transmissions that can achieve more than eight speeds have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of achieving ten forward speeds and one reverse speed by combining a plurality of planetary gear sets and a plurality of frictional elements.

Yet, various aspects of the present invention are directed to providing a planetary gear train of an automatic transmission for a vehicle having further advantages of reducing drag torque and fuel consumption and improving power delivery performance by operating three frictional elements at each shift-speed and thereby minimizing the number of non-operated frictional elements.

In an aspect of the present invention, a planetary gear train of an automatic transmission for a vehicle may include an input shaft receiving torque of an engine, an output shaft outputting a changed torque, a first planetary gear set having three rotation elements and disposed on the input shaft, a second planetary gear set having three rotation elements and disposed at a rear of the first planetary gear set on the input shaft, a third planetary gear set having three rotation elements and disposed at a rear of the second planetary gear set on the input shaft, a fourth planetary gear set having three rotation elements and disposed at a rear of the third planetary gear set on the input shaft, a first rotation shaft provided with a first rotation element of the first planetary gear set and a first rotation element of the second planetary gear set directly connected to the first rotation element of the first planetary gear set, and selectively connected to a transmission housing, a second rotation shaft provided with a second rotation element of the first planetary gear set, a third rotation shaft provided with a third rotation element of the first planetary gear set and directly connected to the input shaft, a fourth rotation shaft provided with a second rotation element of the second planetary gear set and selectively connected to the second rotation shaft or the transmission housing, a fifth rotation shaft provided with a third rotation element of the second planetary gear set, a first rotation element of the third planetary gear set and a first rotation element of the fourth planetary gear set, a sixth rotation shaft provided with a second rotation element of the fourth planetary gear set and selectively connected to the input shaft or the second rotation shaft, a seventh rotation shaft provided with a second rotation element of the third planetary gear set and a third rotation element of the fourth planetary gear set, and connected to the output shaft, an eighth rotation shaft provided with a third rotation element of the third planetary gear set and selectively connected to the transmission housing, and six frictional elements interposed between the rotation shafts or between the rotation shaft and the input shaft or the transmission housing.

Each of the first, second, third and fourth planetary gear sets is a single pinion planetary gear set.

The first rotation shaft is provided with a first sun gear and a second sun gear, the second rotation shaft is provided with a first planet carrier, the third rotation shaft is provided with a first ring gear, the fourth rotation shaft is provided with a second planet carrier, the fifth rotation shaft is provided with a second ring gear and third and fourth sun gears, the sixth rotation shaft is provided with a fourth planet carrier, the seventh rotation shaft is provided with a third planet carrier and a fourth ring gear, and the eighth rotation shaft is provided with a third ring gear.

The six frictional elements may include a first clutch disposed between the second rotation shaft and the fourth rotation shaft, a second clutch disposed between the second rotation shaft and the sixth rotation shaft, a third clutch disposed between the input shaft and the sixth rotation shaft, a first brake disposed between the first rotation shaft and the transmission housing, a second brake disposed between the fourth rotation shaft and the transmission housing, and a third brake disposed between the eighth rotation shaft and the transmission housing.

The second clutch and the second and third brakes are operated at a first forward speed, the first clutch and the second and third brakes are operated at a second forward speed, the first clutch and the first and third brakes are operated at a third forward speed, the second clutch and the first and third brakes are operated at a fourth forward speed, the first and second clutches and the first brake are operated at a fifth forward speed, the first, second and third clutches are operated at a sixth forward speed, the first and third clutches and the first brake are operated at a seventh forward speed, the first and third clutches and the second brake are operated at an eighth forward speed, the third clutch and the first and second brakes are operated at a ninth forward speed, the second and third clutches and the second brake are operated at a tenth forward speed, and the first and second clutches and the second brake are operated at a reverse speed.

In another aspect of the present invention, a planetary gear train of an automatic transmission for a vehicle may include an input shaft receiving torque of an engine, an output shaft outputting a changed torque, a first planetary gear set having a first sun gear, a first planet carrier and a first ring gear as rotation elements thereof, a second planetary gear set having a second sun gear, a second planet carrier and a second ring gear as rotation elements thereof, a third planetary gear set having a third sun gear, a third planet carrier and a third ring gear as rotation elements thereof, a fourth planetary gear set having a fourth sun gear, a fourth planet carrier and a fourth ring gear as rotation elements thereof, a first rotation shaft including the first sun gear and the second sun gear, and selectively connected to a transmission housing, a second rotation shaft including the first planet carrier, a third rotation shaft including the first ring gear and directly connected to the input shaft, a fourth rotation shaft including the second planet carrier and selectively connected to the second rotation shaft or the transmission housing, a fifth rotation shaft including the second ring gear, the third sun gear and the fourth sun gear, a sixth rotation shaft including the fourth planet carrier and selectively connected to the input shaft or the second rotation shaft, a seventh rotation shaft including the third planet carrier and the fourth ring gear, and directly connected to the output shaft, an eighth rotation shaft including the third ring gear and selectively connected to the transmission housing, and six frictional elements interposed between the rotation shafts or between the rotation shaft and the input shaft or the transmission housing.

Each of the first, second, third and fourth planetary gear sets is a single pinion planetary gear set.

The six frictional elements may include a first clutch disposed between the second rotation shaft and the fourth rotation shaft, a second clutch disposed between the second rotation shaft and the sixth rotation shaft, a third clutch disposed between the input shaft and the sixth rotation shaft, a first brake disposed between the first rotation shaft and the transmission housing, a second brake disposed between the fourth rotation shaft and the transmission housing, and a third brake disposed between the eighth rotation shaft and the transmission housing.

The second clutch and the second and third brakes are operated at a first forward speed, the first clutch and the second and third brakes are operated at a second forward speed, the first clutch and the first and third brakes are operated at a third forward speed, the second clutch and the first and third brakes are operated at a fourth forward speed, the first and second clutches and the first brake are operated at a fifth forward speed, the first, second and third clutches are operated at a sixth forward speed, the first and third clutches and the first brake are operated at a seventh forward speed, the first and third clutches and the second brake are operated at an eighth forward speed, the third clutch and the first and second brakes are operated at a ninth forward speed, the second and third clutches and the second brake are operated at a tenth forward speed, and the first and second clutches and the second brake are operated at a reverse speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of frictional elements at each shift-speed applied to a planetary gear train according to an exemplary embodiment of the present invention.

FIG. 3I is a lever diagram of a planetary gear train according to an exemplary embodiment of the present invention at the ninth forward speed.

Figure 1:
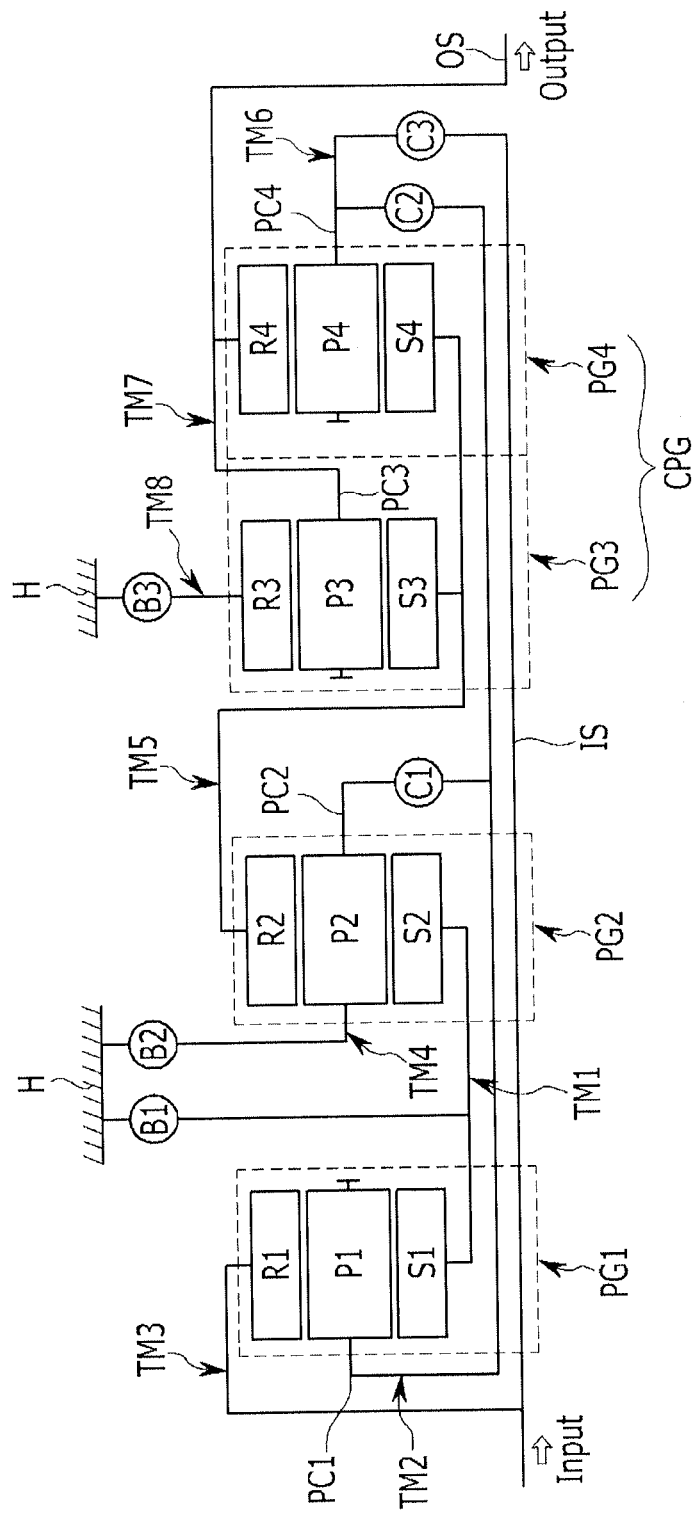
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to an exemplary embodiment of the present invention.

Referring to FIG. 1, a planetary gear train according to an exemplary embodiment of the present invention includes first, second, third and fourth planetary gear sets PG1, PG2, PG3 and PG4 disposed on the same axis, an input shaft IS, an output shaft OS, eight rotation shafts TM1-TM8 including some of rotation elements of the first, second, third and fourth planetary gear sets PG1, PG2, PG3 and PG4, six frictional elements C1, C2, C3, B1, B2 and B3, and a transmission housing H.

Therefore, torque input from the input shaft IS is converted by cooperation of the first, second, third and fourth planetary gear sets PG1, PG2, PG3 and PG4, and then is output through the output shaft OS.

In addition, the planetary gear sets are disposed in a sequence of the first, second, third and fourth planetary gear sets PG1, PG2, PG3 and PG4 from an engine.

The input shaft IS is an input member, and torque from a crankshaft of the engine is changed through a torque converter and is then input to the input shaft IS.

The output shaft OS is an output member and transmits driving torque to a driving wheel through a differential apparatus.

The first planetary gear set PG1 is a single pinion planetary gear set, and includes a first sun gear S1, a first planet carrier PC1 rotatably supporting a first pinion P1 externally meshed with the first sun gear S1, and a first ring gear R1 internally meshed with the first pinion P1 as rotation elements thereof.

The second planetary gear set PG2 is a single pinion planetary gear set, and includes a second sun gear S2, a second planet carrier PC2 rotatably supporting a second pinion P2 externally meshed with the second sun gear S2, and a second ring gear R2 internally meshed with the second pinion P2 as rotation elements thereof.

The third planetary gear set PG3 is a single pinion planetary gear set, and includes a third sun gear S3, a third planet carrier PC3 rotatably supporting a third pinion P3 externally meshed with the third sun gear S3, and a third ring gear R3 internally meshed with the third pinion P3 as rotation elements thereof.

The fourth planetary gear set PG4 is a single pinion planetary gear set, and includes a fourth sun gear S4, a fourth planet carrier PC4 rotatably supporting a fourth pinion P4 externally meshed with the fourth sun gear S4, and a fourth ring gear R4 internally meshed with the fourth pinion P4 as rotation elements thereof.

In addition, the first and second planetary gear sets PG1 and PG2 are operated independently, and the third and fourth planetary gear sets PG3 and PG4 are combined so as to be operated as one compound planetary gear set CPG. Therefore, the first, second, third and fourth planetary gear sets PG1, PG2, PG3, and PG4 change the torque transmitted from the input shaft IS into ten forward speeds and output the changed torque.

The first sun gear S1 of the first planetary gear set PG1 is directly connected to the second sun gear S2 of the second planetary gear set PG2, and the second ring gear R2 of the second planetary gear set PG2 is directly connected to the third sun gear S3 of the third planetary gear set PG3.

In addition, the third sun gear S3 and the third planet carrier PC3 of the third planetary gear set PG3 are directly connected to the fourth sun gear S4 and the fourth ring gear R4 of the fourth planetary gear set PG4, respectively.

Therefore, the planetary gear train according to the present exemplary embodiment includes eight rotation shafts TM1-TM8.

The eight rotation shafts TM1-TM8 will be described in further detail.

A first rotation shaft TM1 includes the first sun gear S1 and the second sun gear S2, and is selectively connected to the transmission housing H.

A second rotation shaft TM2 includes the first planet carrier PC1.

A third rotation shaft TM3 includes the first ring gear R1 and is directly connected to the input shaft IS.

A fourth rotation shaft TM4 includes the second planet carrier PC2 and is selectively connected to the second rotation shaft TM2 or the transmission housing H.

A fifth rotation shaft TM5 includes the second ring gear R2 and the third and fourth sun gears S3 and S4.

A sixth rotation shaft TM6 includes the fourth planet carrier PC4 and is selectively connected to the input shaft IS or the second rotation shaft TM2.

A seventh rotation shaft TM7 includes the third planet carrier PC3 and the fourth ring gear R4, and is directly connected to the output shaft OS.

An eighth rotation shaft TM8 includes the third ring gear R3 and is selectively connected to the transmission housing H.

In addition, three clutches C1, C2, and C3 that are frictional elements are disposed to selectively connect the rotation shafts TM1-TM8 to another rotation shafts TM1-TM8 or the input shaft IS.

In addition, three brakes B1, B2, and B3 that are frictional elements are disposed to selectively connect the rotation shafts TM1-TM8 to the transmission housing H.

A first clutch C1 is interposed between the second rotation shaft TM2 and the fourth rotation shaft TM4, and selectively connects the second and fourth rotation shafts TM2 and TM4.

A second clutch C2 is interposed between the second rotation shaft TM2 and the sixth rotation shaft TM6, and selectively connects the second and sixth rotation shafts TM2 and TM6.

A third clutch C3 is interposed between the input shaft IS and the sixth rotation shaft TM6, and selectively connects the input shaft IS and the sixth rotation shaft TM6.

A first brake B1 is interposed between the first rotation shaft TM1 and the transmission housing H, and operates the first rotation shaft TM1 as a selective fixed element.

A second brake B2 is interposed between the fourth rotation shaft TM4 and the transmission housing H, and operates the fourth rotation shaft TM4 as a selective fixed element.

A third brake B3 is interposed between the eighth rotation shaft TM8 and the transmission housing H, and operates the eighth rotation shaft TM8 as a selective fixed element.

The frictional elements including the first, second, and third clutches C1, C2, and C3 and the first, second, and third brake sB1, B2, and B3 may be conventional multi-plate friction elements of wet type that are operated by hydraulic pressure, but are not limited thereto.

FIG. 2 is an operational chart of frictional elements at each shift-speed applied to a planetary gear train according to an exemplary embodiment of the present invention.

As shown in FIG. 2, three frictional elements are operated at each shift-speed in the planetary gear train according to an exemplary embodiment of the present invention.

The second clutch C2 and the second and third brakes B2 and B3 are operated at a first forward speed $1^{ST}$.

The first clutch C1 and the second and third brakes B2 and B3 are operated at a second forward speed $2^{ND}$.

The first clutch C1 and the first and third brakes B1 and B3 are operated at a third forward speed $3^{RD}$.

The second clutch C2 and the first and third brakes B1 and B3 are operated at a fourth forward speed $4^{TH}$.

The first and second clutches C1 and C2 and the first brake B1 are operated at a fifth forward speed $5^{TH}$.

The first, second, and third clutches C1, C2, and C3 are operated at a sixth forward speed $6^{TH}$.

The first and third clutches C1 and C3 and the first brake B1 are operated at a seventh forward speed $7^{TH}$.

The first and third clutches C1 and C3 and the second brake B2 are operated at an eighth forward speed $8^{TH}$.

The third clutch C3 and the first and second brakes B1 and B2 are operated at a ninth forward speed $9^{TH}$.

The second and third clutches C2 and C3 and the second brake B2 are operated at a tenth forward speed $10^{TH}$.

The first and second clutches C1 and C2 and the second brake B2 are operated at a reverse speed Rev.

FIG. 3A to FIG. 3K are lever diagrams of a planetary gear train according to an exemplary embodiment of the present invention, and illustrate shift processes of the planetary gear train according to an exemplary embodiment of the present invention by lever analysis method.

Referring to FIG. 3A to FIG. 3K, three vertical lines of the first planetary gear set PG1 are set as the first rotation shaft TM1, the second rotation shaft TM2, and the third rotation shaft TM3, three vertical lines of the second planetary gear set PG2 are set as the first rotation shaft TM1, the fourth rotation shaft TM4, and the fifth rotation shaft TM5, and four vertical lines of the compound planetary gear set CPG are set as the fifth rotation shaft TM5, the sixth rotation shaft TM6, the seventh rotation shaft TM7, and the eighth rotation shaft TM8.

A middle horizontal line represents a rotation speed of "0", an upper horizontal line represents positive rotation speed and a lower horizontal line represents negative rotation speed.

Distances between the vertical lines of the first and second planetary gear sets PG1 and PG2 and the compound planetary gear set CPG are set according to gear ratios (teeth number of a sun gear/teeth number of a ring gear).

In addition, setting of the rotation shafts on the vertical lines may be well known to a person of an ordinary skill in the art of planetary gear trains, and thus detailed description thereof will be omitted.

Hereinafter, referring to FIG. 2 and FIG. 3A to FIG. 3K, the shift processes of the planetary gear train according to an exemplary embodiment of the present invention will be described in detail.

[First Forward Speed]

Referring to FIG. 2, the second clutch C2 and the second and third brakes B2 and B3 are operated at the first forward speed $1^{ST}$.

Figure 3A:
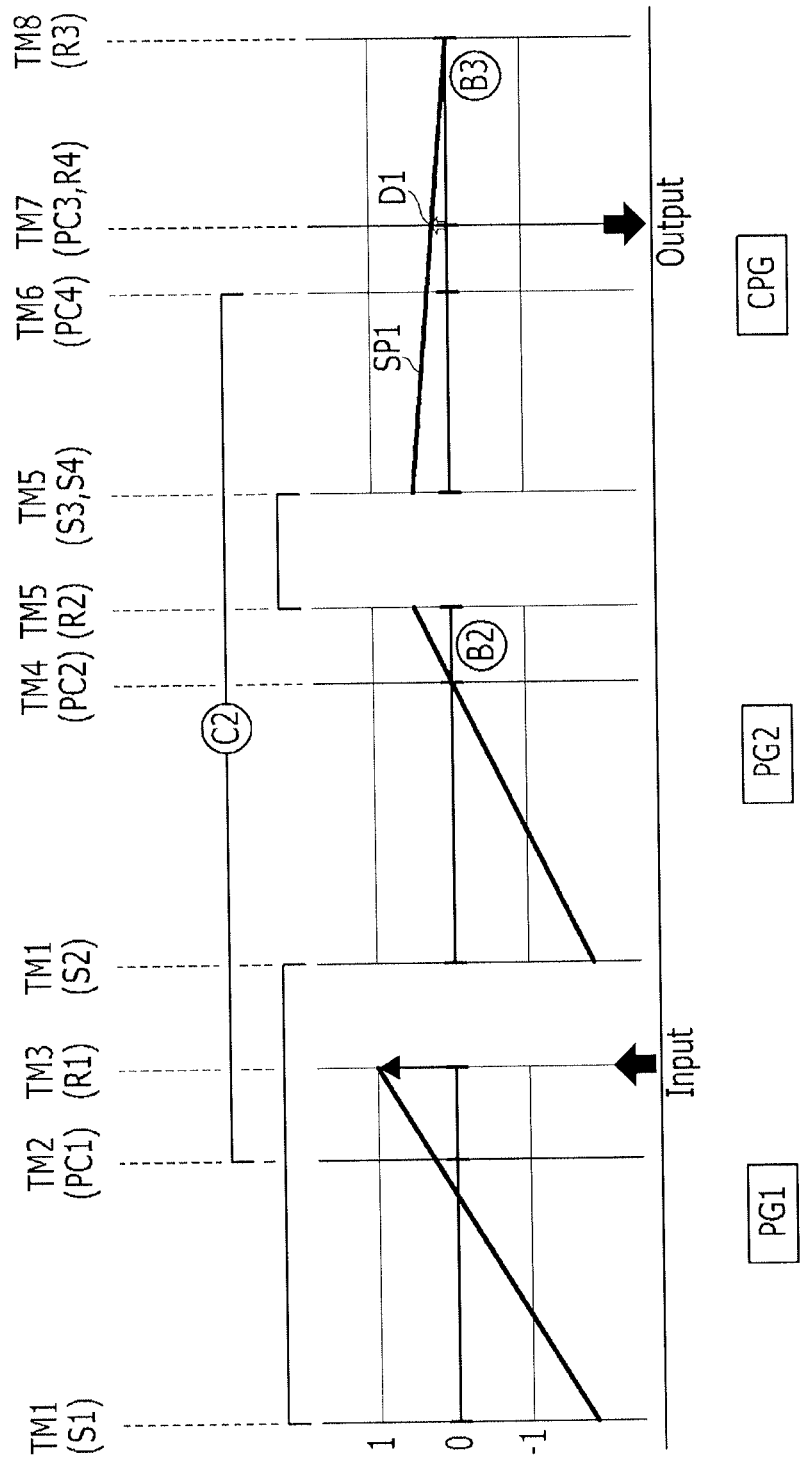
FIG. 3A is a lever diagram of a planetary gear train according to an exemplary embodiment of the present invention at the first forward speed.

As shown in FIG. 3A, in a state that rotation speed of the input shaft IS is input to the third rotation shaft TM3, the second rotation shaft TM2 and the sixth rotation shaft TM6 are connected by operation of the second clutch C2 and the fourth rotation shaft TM4 and the eighth rotation shaft TM8 are operated as the fixed elements by operation of the second and third brakes B2 and B3.

Therefore, the rotation elements of the compound planetary gear set CPG form a first shift line SP1 and D1 is output through the seventh rotation shaft TM7 that is the output element.

[Second Forward Speed]

The second clutch C2 that was operated at the first forward speed is released and the first clutch C1 is operated at the second forward speed $2^{ND}$.

Figure 3B:
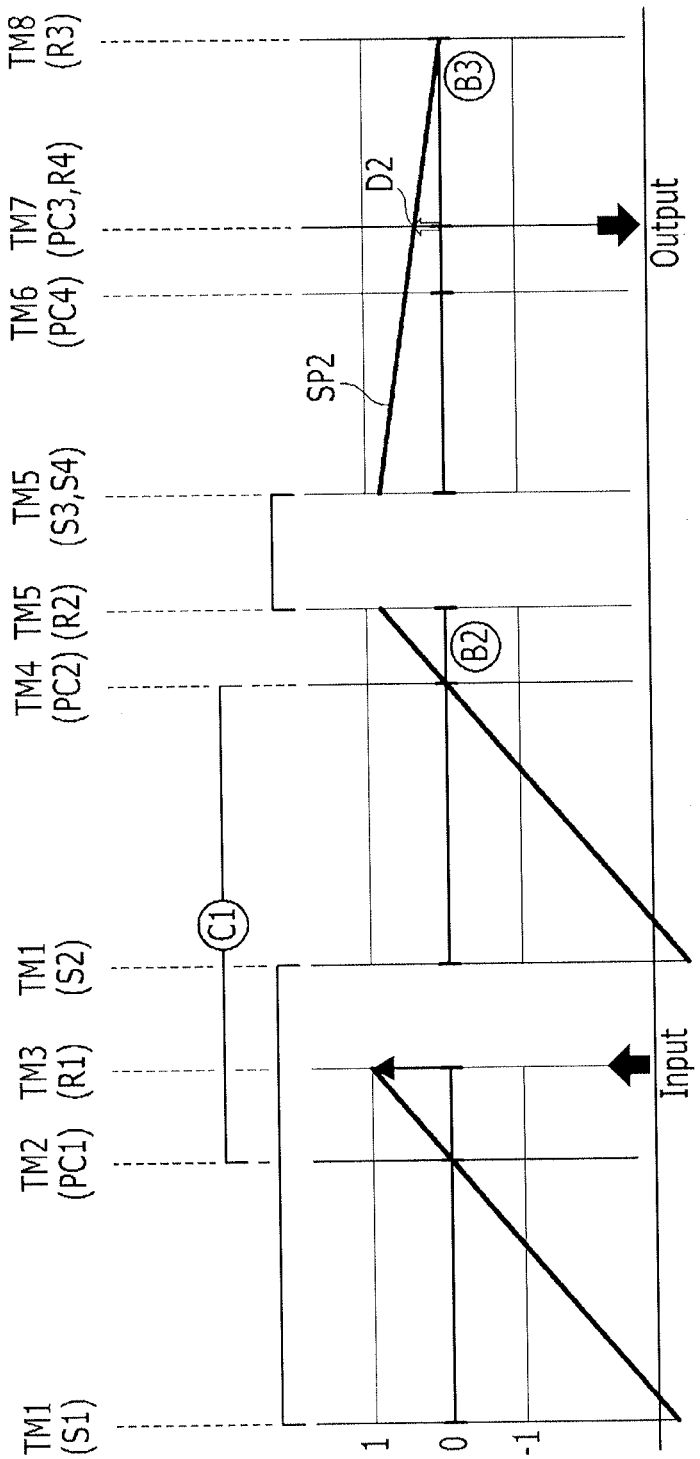
FIG. 3B is a lever diagram of a planetary gear train according to an exemplary embodiment of the present invention at the second forward speed.

As shown in FIG. 3B, in a state that the rotation speed of the input shaft IS is input to the third rotation shaft TM3, the second rotation shaft TM2 and the fourth rotation shaft TM4 are connected by operation of the first clutch C1 and the fourth rotation shaft TM4 and the eighth rotation shaft TM8 are operated as the fixed elements by operation of the second and third brakes B2 and B3.

Therefore, the rotation elements of the compound planetary gear set CPG form a second shift line SP2 and D2 is output through the seventh rotation shaft TM7 that is the output element.

[Third Forward Speed]

The second brake B2 that was operated at the second forward speed is released and the first brake B1 is operated at the third forward speed $3^{RD}$.

Figure 3C:
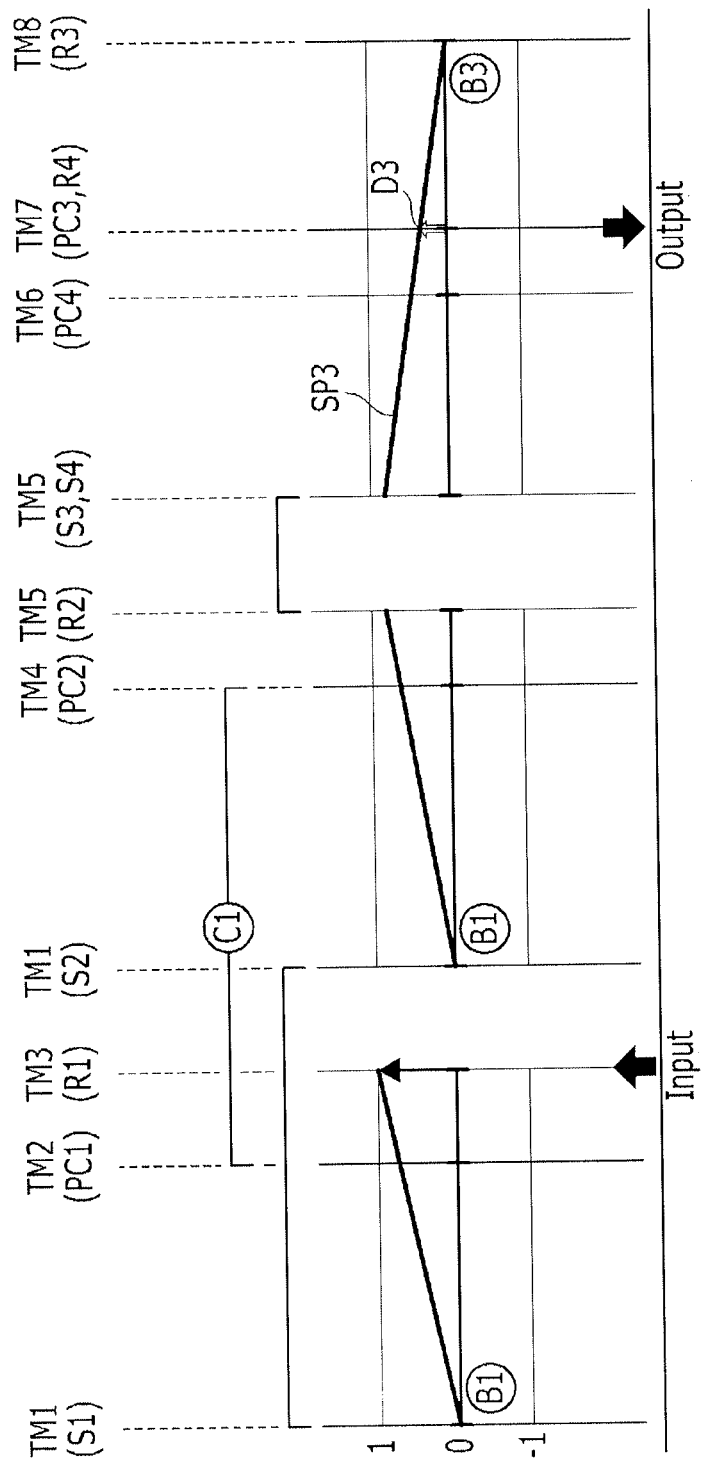
FIG. 3C is a lever diagram of a planetary gear train according to an exemplary embodiment of the present invention at the third forward speed.

As shown in FIG. 3C, in a state that the rotation speed of the input shaft IS is input to the third rotation shaft TM3, the second rotation shaft TM2 and the fourth rotation shaft TM4 are connected by operation of the first clutch C1 and the first rotation shaft TM1 and the eighth rotation shaft TM8 are operated as the fixed elements by operation of the first and third brakes B1 and B3.

Therefore, the rotation elements of the compound planetary gear set CPG form a third shift line SP3 and D3 is output through the seventh rotation shaft TM7 that is the output element.

[Fourth Forward Speed]

The first clutch C1 that was operated at the third forward speed is released and the second clutch C2 is operated at the fourth forward speed $4^{TH}$.

Figure 3D:
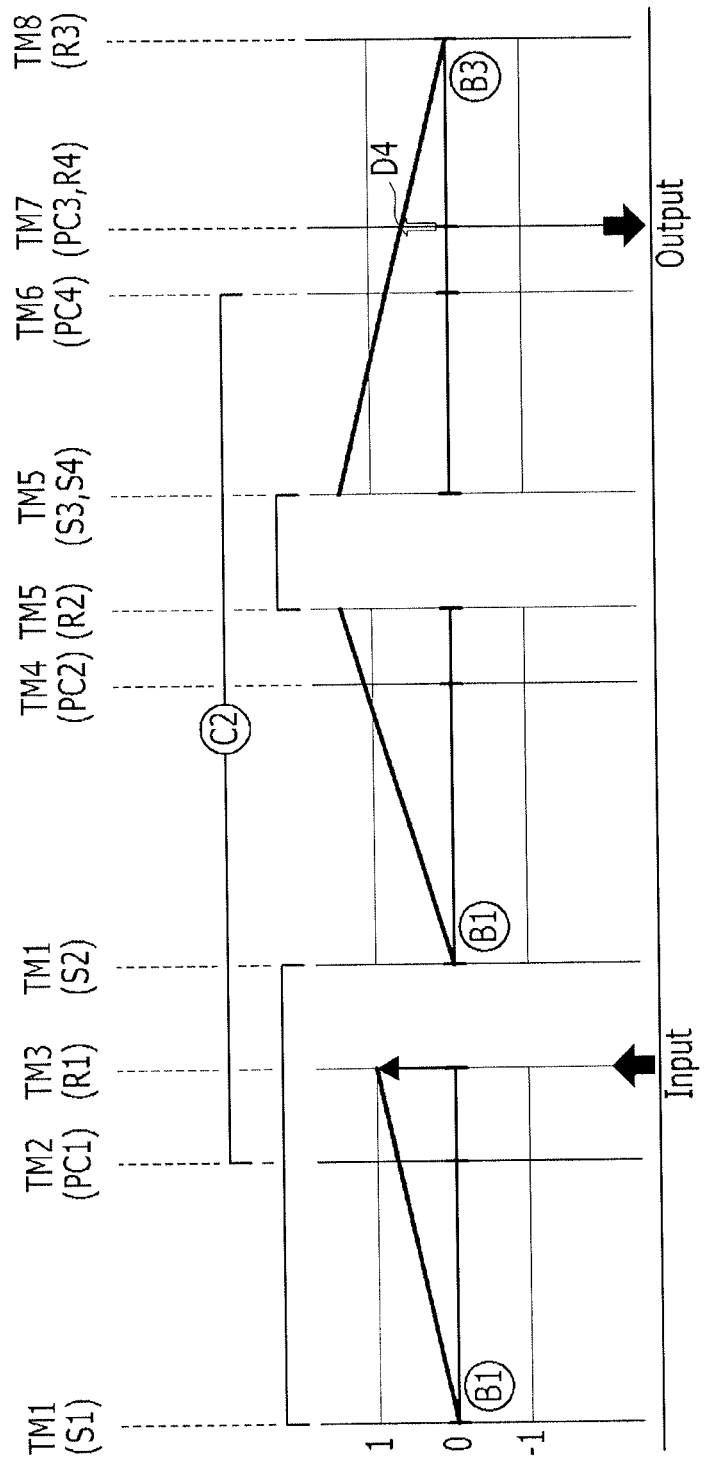
FIG. 3D is a lever diagram of a planetary gear train according to an exemplary embodiment of the present invention at the fourth forward speed.

As shown in FIG. 3D, in a state the rotation speed of the input shaft IS is input to the third rotation shaft TM3, the second rotation shaft TM2 and the sixth rotation shaft TM6 are connected by operation of the second clutch C2 and the first rotation shaft TM1 and the eighth rotation shaft TM8 are operated as the fixed elements by operation of the first and third brakes B1 and B3.

Therefore, the rotation elements of the compound planetary gear set CPG form a fourth shift line SP4 and D4 is output through the seventh rotation shaft TM7 that is the output element.

[Fifth Forward Speed]

The third brake B3 that was operated at the fourth forward speed is released and the first clutch C1 is operated at the fifth forward speed $5^{TH}$.

Figure 3E:
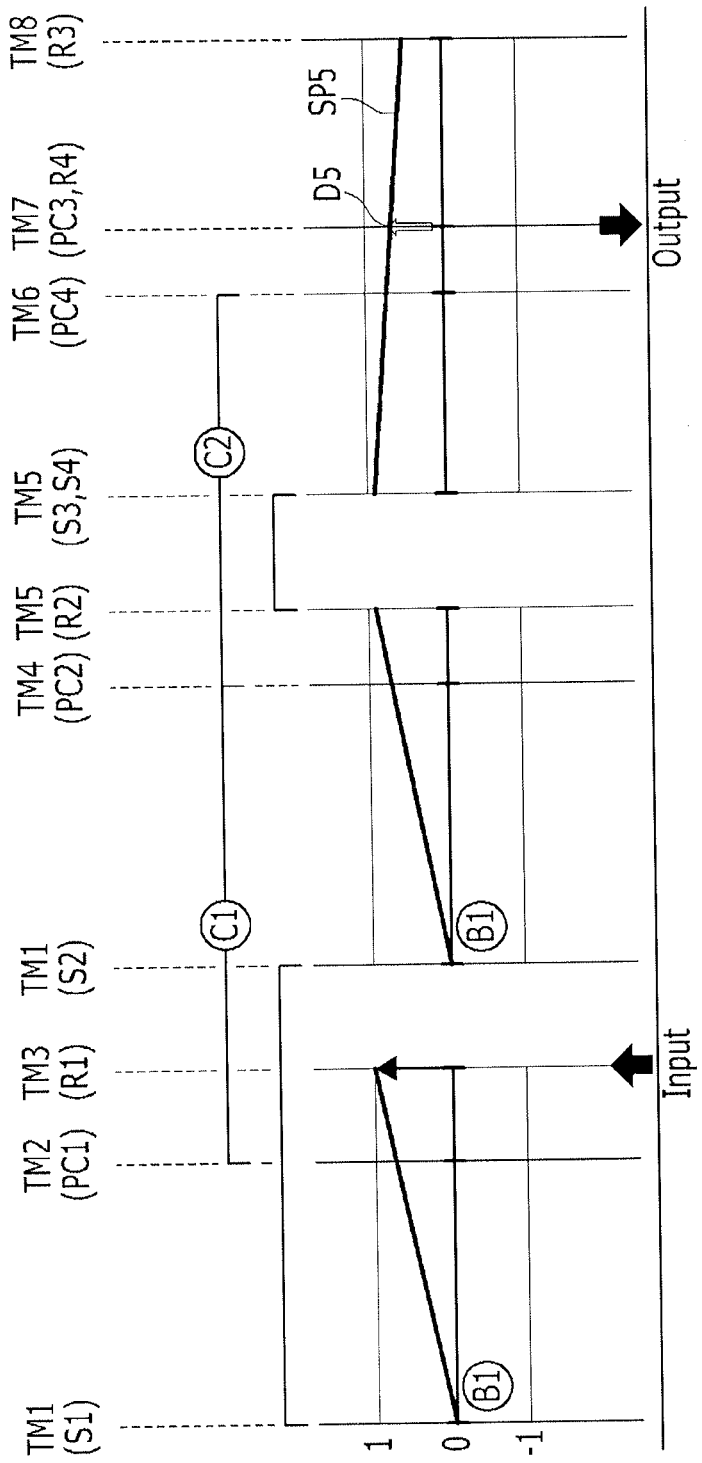
FIG. 3E is a lever diagram of a planetary gear train according to various exemplary embodiments of the present invention at the fifth forward speed.

As shown in FIG. 3E, in a state that the rotation speed of the input shaft IS is input to the third rotation shaft TM3, the second, fourth, and sixth rotation shafts TM2, TM4, and TM6 are connected by operation of the first and second clutches C1 and C2 and the first rotation shaft TM1 is operated as the fixed element by operation of the first brake B1.

Therefore, the rotation elements of the compound planetary gear set CPG form a fifth shift line SP5 and D5 is output through the seventh rotation shaft TM7 that is the output element.

[Sixth Forward Speed]

The first brake B1 that was operated at the fifth forward speed is released and the third clutch C3 is operated at the sixth forward speed $6^{TH}$.

Figure 3F:
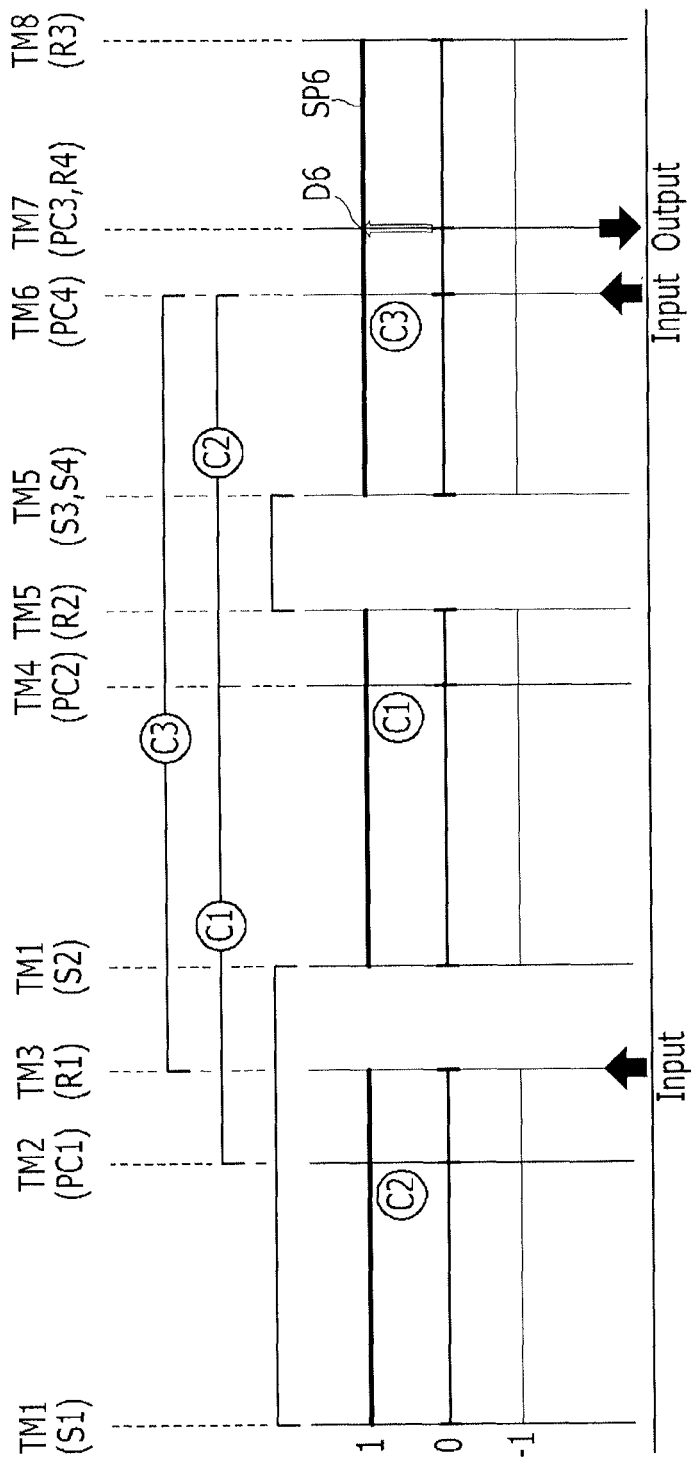
FIG. 3F is a lever diagram of a planetary gear train according to an exemplary embodiment of the present invention at the sixth forward speed.

As shown in FIG. 3F, the second rotation shaft TM2 and the fourth rotation shaft TM4 are connected by operation of the first clutch C1, the fourth rotation shaft TM4 and the sixth rotation shaft TM6 are connected by operation of the second clutch C2, and the third rotation shaft TM3 and the sixth rotation shaft TM6 are connected by operation of the third clutch C3. Therefore, the rotation speed of the input shaft IS is simultaneously input to the third rotation shaft TM3 and the sixth rotation shaft TM6.

Therefore, the first and second planetary gear sets PG1 and PG2 and the compound planetary gear set CPG become direct-coupling state, and the rotation elements of the compound planetary gear set CPG form a sixth shift line SP6. Therefore, D6 is output through the seventh rotation shaft TM7 that is the output element.

[Seventh Forward Speed]

The second clutch C2 that was operated at the sixth forward speed is released and first brake B1 is operated at the seventh forward speed $7^{TH}$.

Figure 3G:
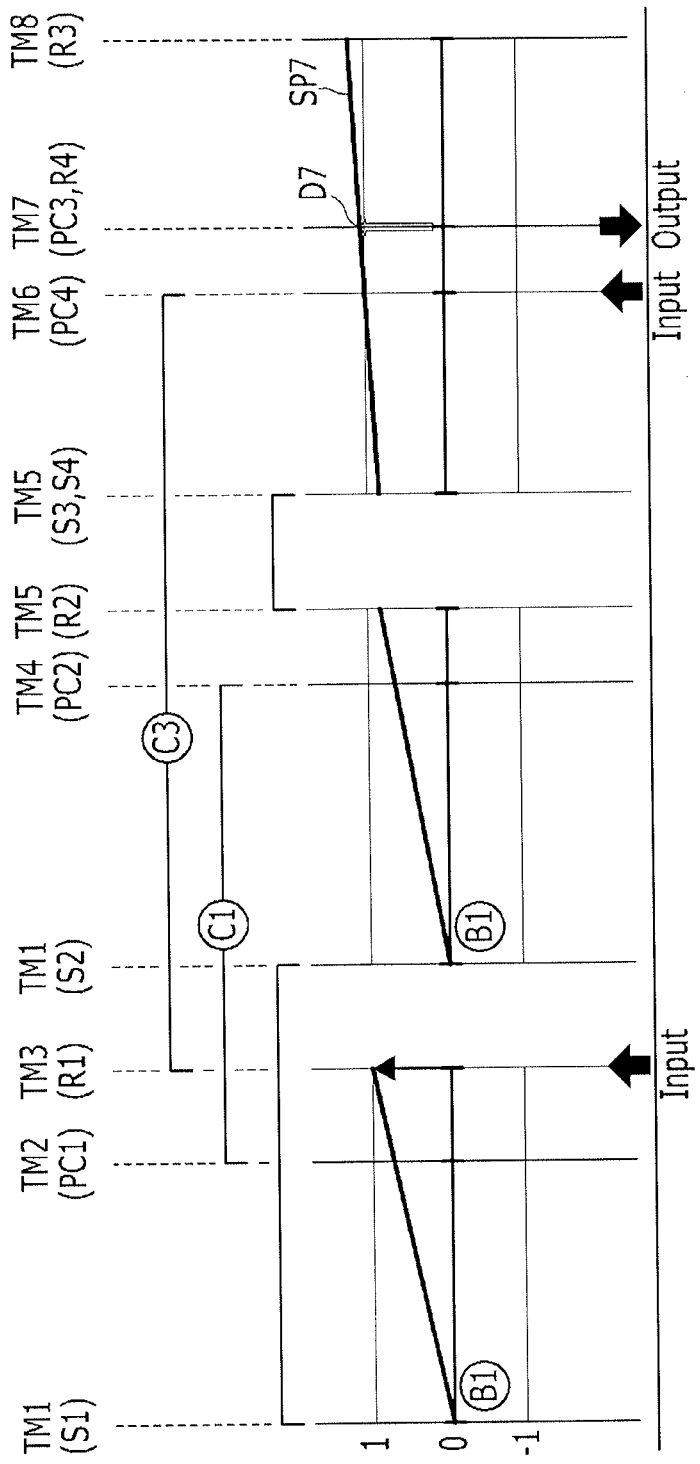
FIG. 3G is a lever diagram of a planetary gear train according to an exemplary embodiment of the present invention at the seventh forward speed.

As shown in FIG. 3G, the second rotation shaft TM2 and the fourth rotation shaft TM4 are connected by operation of the first clutch C1, and the third rotation shaft TM3 and the sixth rotation shaft TM6 are connected by operation of the third clutch C3. Therefore, the rotation speed of the input shaft IS is simultaneously input to the third rotation shaft TM3 and the sixth rotation shaft TM6. In addition, the first rotation shaft TM1 is operated as the fixed element by operation of the first brake B1.

Therefore, the rotation elements of the compound planetary gear set CPG form a seventh shift line SP7 and D7 is output through the seventh rotation shaft TM7 that is the output element.

[Eighth Forward Speed]

The first brake B1 that was operated at the seventh forward speed is released and the second brake B2 is operated at the eighth forward speed $8^{TH}$.

Figure 3H:
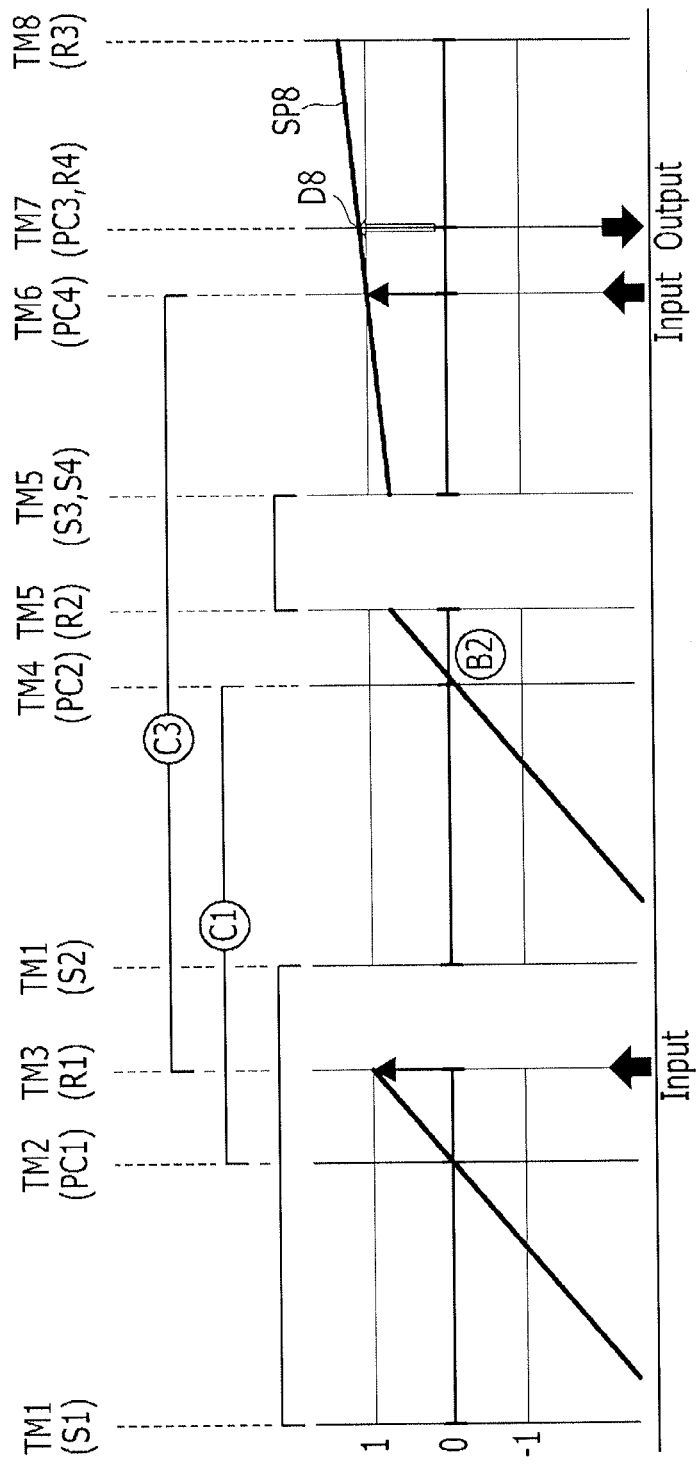
FIG. 3H is a lever diagram of a planetary gear train according to an exemplary embodiment of the present invention at the eighth forward speed.

As shown in FIG. 3H, the second rotation shaft TM2 and the fourth rotation shaft TM4 are connected by operation of the first clutch C1, and the third rotation shaft TM3 and the sixth rotation shaft TM6 are connected by operation of the third clutch C3. Therefore, the rotation speed of the input shaft IS is simultaneously input to the third rotation shaft TM3 and the sixth rotation shaft TM6. In addition, the second rotation shaft TM2 and the fourth rotation shaft TM4 are operated as the fixed elements by operation of the second brake B2.

Therefore, the rotation elements of the compound planetary gear set CPG form an eighth shift line SP8 and D8 is output through the seventh rotation shaft TM7 that is the output element.

[Ninth Forward Speed]

The first clutch C1 that was operated at the eighth forward speed is released and the first brake B1 is operated at the ninth forward speed $9^{TH}$.

As shown in FIG. 3I, the third rotation shaft TM3 and the sixth rotation shaft TM6 are connected by operation of the third clutch C3. Therefore, the rotation speed of the input shaft IS is simultaneously input to the third rotation shaft TM3 and the sixth rotation shaft TM6. In addition, the first rotation shaft TM1 and the fourth rotation shaft TM4 are operated as the fixed elements by operation of the first and second brakes B1 and B2.

Therefore, the rotation elements of the compound planetary gear set CPG form a ninth shift line SP9 and D9 is output through the seventh rotation shaft TM7 that is the output element.

[Tenth Forward Speed]

The first brake B1 that was operated at the ninth forward speed is released and the second clutch C2 is operated at the tenth forward speed $10^{TH}$.

Figure 3J:
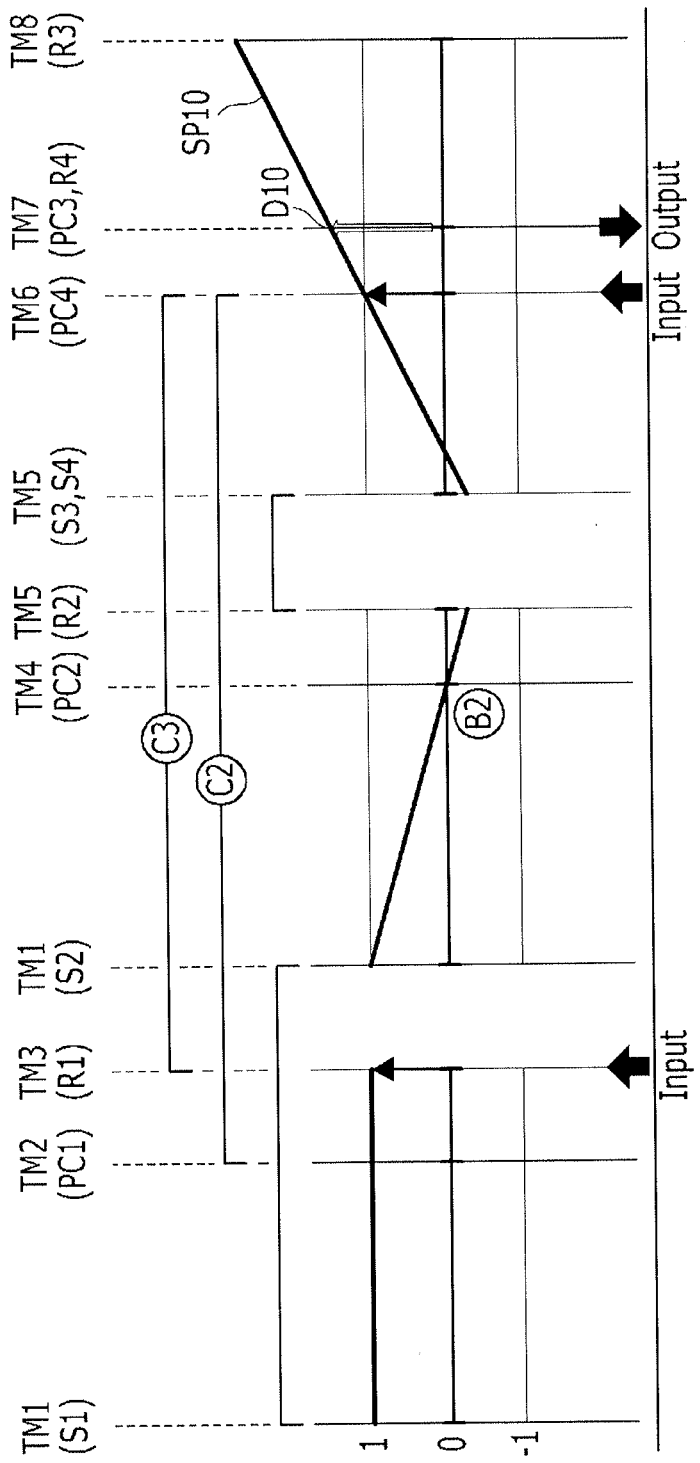
FIG. 3J is a lever diagram of a planetary gear train according to an exemplary embodiment of the present invention at the tenth forward speed.

As shown in FIG. 3J, the second rotation shaft TM2 and the sixth rotation shaft TM6 are connected by operation of the second clutch C2, and the third rotation shaft TM3 and the sixth rotation shaft TM6 are connected by operation of the third clutch C3. Therefore, the rotation speed of the input shaft IS is simultaneously input to the third rotation shaft TM3 and the sixth rotation shaft TM6. In addition, the fourth rotation shaft TM4 is operated as the fixed element by operation of the second brake B2.

Therefore, the rotation elements of the compound planetary gear set CPG form a tenth shift line SP10 and D10 is output through the seventh rotation shaft TM7 that is the output element.

[Reverse Speed]

The first clutch C1, the second clutch C2 and the second brake B2 are operated at the reverse speed Rev.

Figure 3K:
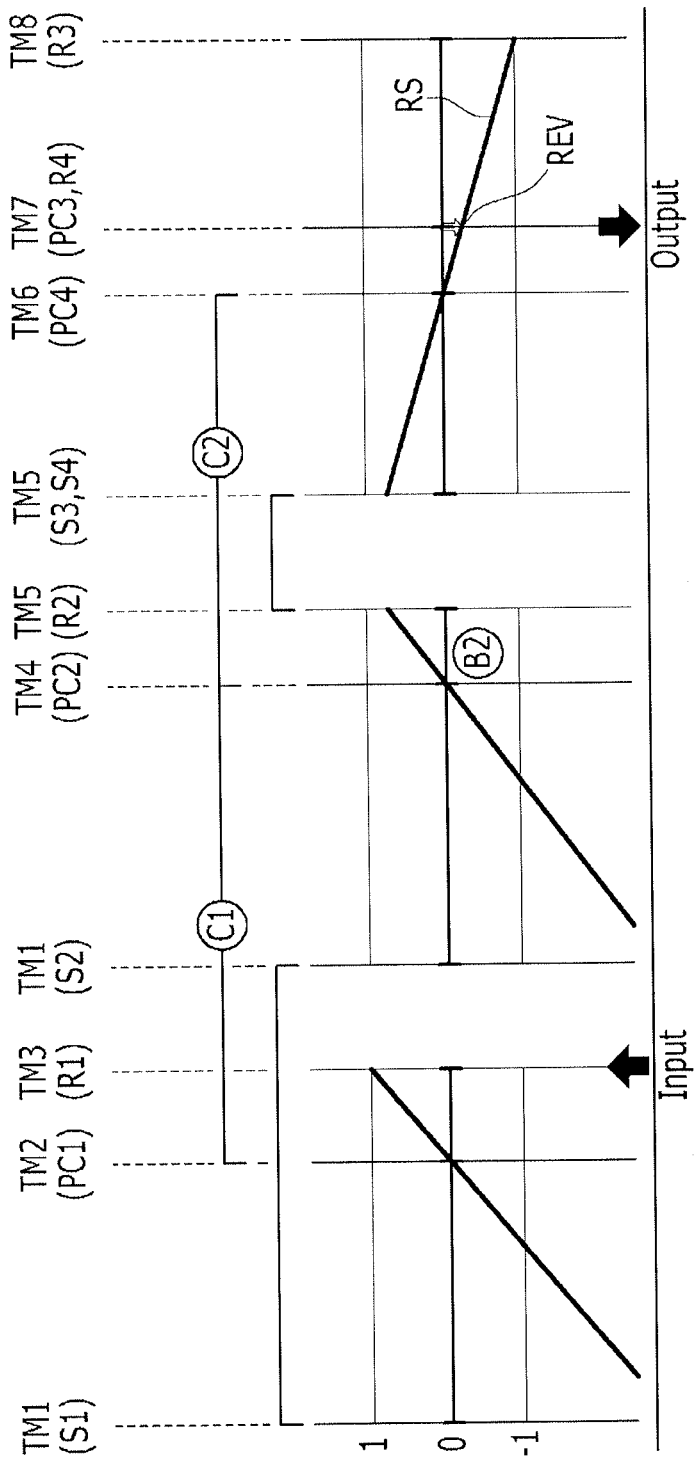
FIG. 3K is a lever diagram of a planetary gear train according to an exemplary embodiment of the present invention at the reverse speed.

As shown in FIG. 3K, in a state that the rotation speed of the input shaft IS is input to the third rotation shaft TM3, the second rotation shaft TM2 and the fourth rotation shaft TM4 are connected by operation of the first clutch C1, the fourth rotation shaft TM4 and the sixth rotation shaft TM6 are connected by operation of the second clutch C2, and the fourth rotation shaft TM4 are operated as the fixed element by operation of the second brake B2.

Therefore, the rotation elements of the compound planetary gear set CPG form a reverse shift line RS and REV is output through the seventh rotation shaft TM7 that is the output element.

The planetary gear train according to the exemplary embodiment of the present invention may achieve ten forward speeds and one reverse speed by combining four planetary gear sets PG1, PG2, PG3, and PG4 with three clutches C1, C2, and C3 and three brakes B1, B2, and B3.

Therefore, the planetary gear train according to the exemplary embodiment of the present invention can improve power delivery efficiency and fuel economy by achieving multiple shift-speeds of the automatic transmission.

Since three frictional elements are operated at each shift-speed, frictional drag loss may be reduced and power delivery efficiency and fuel economy may be further improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A planetary gear train of an automatic transmission for a vehicle comprising:
an input shaft receiving torque of an engine;
an output shaft outputting a changed torque;
a first planetary gear set having three rotation elements and disposed on the input shaft;
a second planetary gear set having three rotation elements and disposed at a rear of the first planetary gear set on the input shaft;
a third planetary gear set having three rotation elements and disposed at a rear of the second planetary gear set on the input shaft;
a fourth planetary gear set having three rotation elements and disposed at a rear of the third planetary gear set on the input shaft;
a first rotation shaft provided with a first rotation element of the first planetary gear set and a first rotation element of the second planetary gear set directly connected to the first rotation element of the first planetary gear set, and selectively connected to a transmission housing;
a second rotation shaft provided with a second rotation element of the first planetary gear set;
a third rotation shaft provided with a third rotation element of the first planetary gear set and directly connected to the input shaft;
a fourth rotation shaft provided with a second rotation element of the second planetary gear set and selectively connected to the second rotation shaft or the transmission housing;
a fifth rotation shaft provided with a third rotation element of the second planetary gear set, a first rotation element of the third planetary gear set and a first rotation element of the fourth planetary gear set;
a sixth rotation shaft provided with a second rotation element of the fourth planetary gear set and selectively connected to the input shaft or the second rotation shaft;
a seventh rotation shaft provided with a second rotation element of the third planetary gear set and a third rotation element of the fourth planetary gear set, and connected to the output shaft;
an eighth rotation shaft provided with a third rotation element of the third planetary gear set and selectively connected to the transmission housing; and
six frictional elements interposed between the rotation shafts or between the rotation shaft and the input shaft or the transmission housing.

2. The planetary gear train of claim 1, wherein each of the first, second, third and fourth planetary gear sets is a single pinion planetary gear set.

3. The planetary gear train of claim 2, wherein the first rotation shaft is provided with a first sun gear and a second sun gear,
the second rotation shaft is provided with a first planet carrier,
the third rotation shaft is provided with a first ring gear,
the fourth rotation shaft is provided with a second planet carrier,
the fifth rotation shaft is provided with a second ring gear and third and fourth sun gears,
the sixth rotation shaft is provided with a fourth planet carrier,
the seventh rotation shaft is provided with a third planet carrier and a fourth ring gear, and
the eighth rotation shaft is provided with a third ring gear.

4. The planetary gear train of claim 1, wherein the six frictional elements comprises:
a first clutch disposed between the second rotation shaft and the fourth rotation shaft;
a second clutch disposed between the second rotation shaft and the sixth rotation shaft;
a third clutch disposed between the input shaft and the sixth rotation shaft;
a first brake disposed between the first rotation shaft and the transmission housing;
a second brake disposed between the fourth rotation shaft and the transmission housing; and
a third brake disposed between the eighth rotation shaft and the transmission housing.

5. The planetary gear train of claim 4, wherein the second clutch and the second and third brakes are operated at a first forward speed,
the first clutch and the second and third brakes are operated at a second forward speed,
the first clutch and the first and third brakes are operated at a third forward speed,
the second clutch and the first and third brakes are operated at a fourth forward speed,
the first and second clutches and the first brake are operated at a fifth forward speed,
the first, second and third clutches are operated at a sixth forward speed,
the first and third clutches and the first brake are operated at a seventh forward speed,
the first and third clutches and the second brake are operated at an eighth forward speed,
the third clutch and the first and second brakes are operated at a ninth forward speed,
the second and third clutches and the second brake are operated at a tenth forward speed, and
the first and second clutches and the second brake are operated at a reverse speed.

6. A planetary gear train of an automatic transmission for a vehicle comprising:
an input shaft receiving torque of an engine;
an output shaft outputting a changed torque;
a first planetary gear set having a first sun gear, a first planet carrier and a first ring gear as rotation elements thereof;
a second planetary gear set having a second sun gear, a second planet carrier and a second ring gear as rotation elements thereof;
a third planetary gear set having a third sun gear, a third planet carrier and a third ring gear as rotation elements thereof;
a fourth planetary gear set having a fourth sun gear, a fourth planet carrier and a fourth ring gear as rotation elements thereof;
a first rotation shaft including the first sun gear and the second sun gear, and selectively connected to a transmission housing;
a second rotation shaft including the first planet carrier;
a third rotation shaft including the first ring gear and directly connected to the input shaft;
a fourth rotation shaft including the second planet carrier and selectively connected to the second rotation shaft or the transmission housing;
a fifth rotation shaft including the second ring gear, the third sun gear and the fourth sun gear;
a sixth rotation shaft including the fourth planet carrier and selectively connected to the input shaft or the second rotation shaft;

a seventh rotation shaft including the third planet carrier and the fourth ring gear, and directly connected to the output shaft;

an eighth rotation shaft including the third ring gear and selectively connected to the transmission housing; and six frictional elements interposed between the rotation shafts or between the rotation shaft and the input shaft or the transmission housing.

7. The planetary gear train of claim 6, wherein each of the first, second, third and fourth planetary gear sets is a single pinion planetary gear set.

8. The planetary gear train of claim 6, wherein the six frictional elements comprises:

a first clutch disposed between the second rotation shaft and the fourth rotation shaft;

a second clutch disposed between the second rotation shaft and the sixth rotation shaft;

a third clutch disposed between the input shaft and the sixth rotation shaft;

a first brake disposed between the first rotation shaft and the transmission housing;

a second brake disposed between the fourth rotation shaft and the transmission housing; and a third brake disposed between the eighth rotation shaft and the transmission housing.

9. The planetary gear train of claim 8, wherein the second clutch and the second and third brakes are operated at a first forward speed, the first clutch and the second and third brakes are operated at a second forward speed, the first clutch and the first and third brakes are operated at a third forward speed, the second clutch and the first and third brakes are operated at a fourth forward speed, the first and second clutches and the first brake are operated at a fifth forward speed, the first, second and third clutches are operated at a sixth forward speed, the first and third clutches and the first brake are operated at a seventh forward speed, the first and third clutches and the second brake are operated at an eighth forward speed, the third clutch and the first and second brakes are operated at a ninth forward speed, the second and third clutches and the second brake are operated at a tenth forward speed, and the first and second clutches and the second brake are operated at a reverse speed.

* * * * *